Feb. 9, 1965 A. J. LAVIN ET AL 3,169,203

SQUARE WAVE PULSE GENERATOR

Filed March 28, 1961 4 Sheets-Sheet 1

INVENTORS
ANDREW J. LAVIN
WENDELL J. WHEELER

BY Donald F Voss

ATTORNEY

Feb. 9, 1965 A. J. LAVIN ET AL 3,169,203

SQUARE WAVE PULSE GENERATOR

Filed March 28, 1961 4 Sheets-Sheet 2

SQUARE WAVE PULSE GENERATOR

Filed March 28, 1961 4 Sheets-Sheet 4

United States Patent Office 3,169,203
Patented Feb. 9, 1965

3,169,203

SQUARE WAVE PULSE GENERATOR

Andrew J. Lavin, Union, and Wendell J. Wheeler, Endwell, N.Y., assignors to International Business Machines Corporation, New York, N.Y., a corporation of New York Filed Mar. 28, 1961, Ser. No. 98,885
9 Claims. (Cl. 310—156)

This invention relates to dynamo-electric machines and, particularly, to alternating current generators having a permanent magnet excitation system and capable of generating voltages having a square or rectangular waveform.

Attempts made heretofore to achieve a voltage having a square or rectangular waveform have not been particularly successful because of the approaches taken. In order to achieve a voltage waveform approaching a rectangular or squared condition, the rise and decay time should be small compared to the period and the ratio of rise and decay time to the period should be substantially constant for all frequencies.

The voltage waveform is discontinuous in character. Since the voltage waveform is the derivative of the flux linkage curve, the flux linkage curve is therefore necessarily a sawtooth form with the slope changing abruptly from one direction to an opposite direction. The points where the flux linkage curve changes direction are the points of discontinuity of the voltage waveform. These points are related to each other in a linear manner.

In order to satisfy the basic condition imposed by the flux linkage curve; i.e., that the slope thereof be constant and that the slope change abruptly from one direction to an opposite direction, it has been ascertained that certain geometrical relationships must exist. The ratio of polar to interpolar spaces of the rotor is one to one and the number of polar and interpolar spaces is equal to the number of stator teeth of the stator, the stator teeth being symmetrically arranged. Hence, the ratio of rotor poles to stator teeth in each output phase is one to one, there being one or two output phases depending upon the coil winding arrangement upon the stator teeth. The width of the rotor poles and stator teeth should be the same and equal to one-half the pitch. The coils in which the voltage is generated are individually wound upon each stator tooth in a manner that the voltage is due entirely to the time rate of change of flux linkage. The amount of flux linking any one coil winding is controlled so that the flux linkage curve has substantially a constant slope with the slope changing direction abruptly. This is accomplished by providing a magnetic circuit path for the flux which is not to link the coil windings with an equivalent reluctance to that of the magnetic circuit path for the flux which is to link any one coil winding. Having provided such a magnetic path for the nonlinking flux, the portion of the primary polar field linking the coil winding is directly related in time to the motion of field moving relative to the coil winding. The amount of flux which is to link any one coil winding varies according to the position of the induced magnetic fields produced by the rotor poles with respect to said any one coil winding.

Control over the amount of flux linking any one coil winding is achieved by providing an inner stator ring having a non-interrupted or continuous surface. This arrangement substantially maintains a uniform reluctance in all magnetic circuits. The stator is a continuous ring provided with arcuately spaced closed winding slots entered into laminations forming the stator. The width of the section of the stator at the bottom of the winding slots adjacent the rotor surface is maintained at a small sectional thickness. Hence, the material at this point saturates at a low level of magnetic induction and prevents any noticeable magnetic shorting of the primary field. It is also to be noted that there are no non-uniform magnetic fields in the air gap as found in generator constructions having open winding slots. These non-uniform magnetic fields of the latter construction are due to the cornering effects or magnetic field concentration at corners.

Accordingly, a prime object of the invention is to provide an improved alternating current generator capable of generating an alternating current voltage having a square or rectangular waveform.

A very important object of the invention is to provide an improved alternating current generator wherein the amount of flux, whether it be increasing or decreasing, linking any one winding is controlled.

Another very important object of the invention is to provide an improved alternating current generator which maintains substantially a uniform and constant reluctance in all magnetic circuit paths.

Still another very important object of the invention is to provide an alternating current generator which generates a voltage waveform derived from a flux linkage curve having substantially a constant slope and an abrupt change in slope from one direction to an opposite direction.

The foregoing and other objects, features and advantages of the invention will be apparent from the following more particular description of preferred embodiments of the invention, as illustrated in the accompanying drawings.

Figure 9:
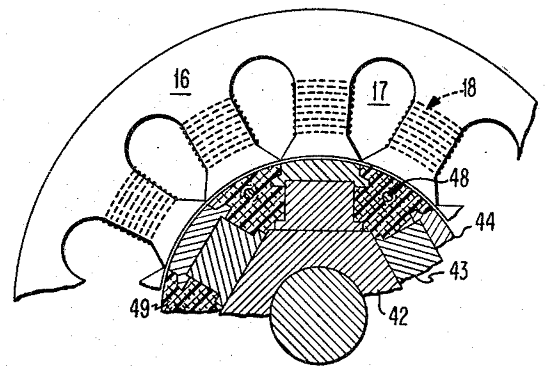
Figure 7:
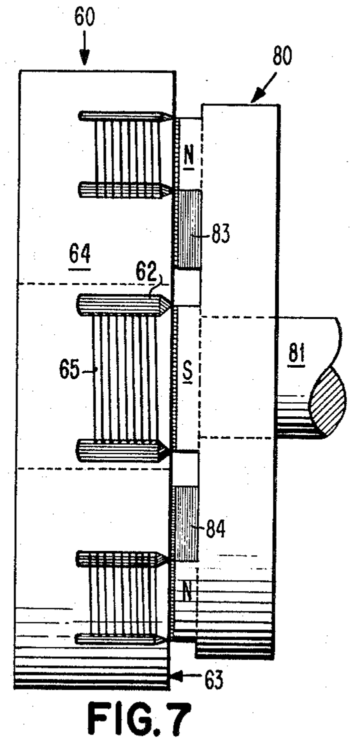
Figure 8:
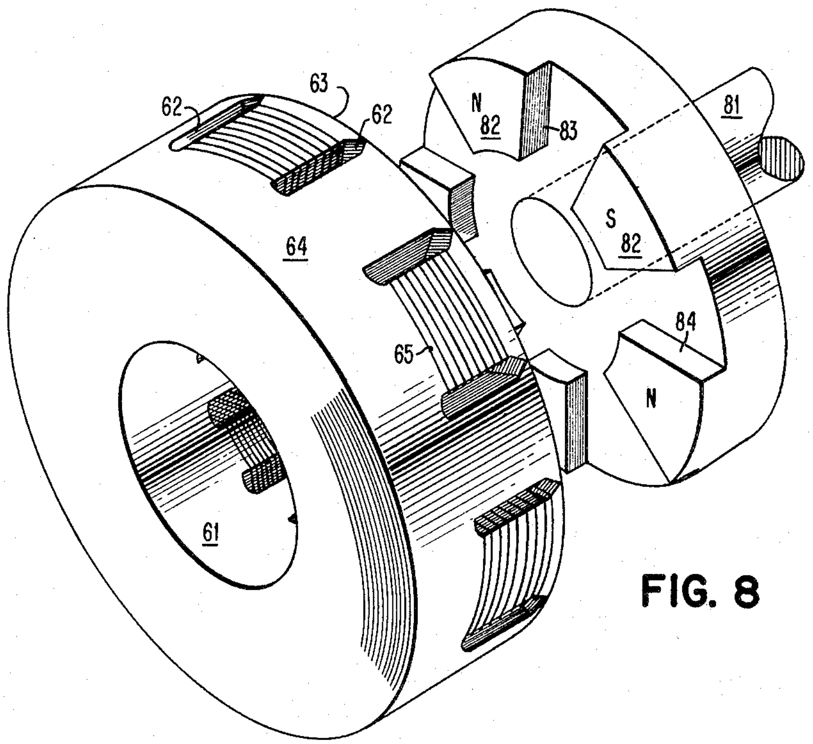

FIGS. *5a, 5b, 5c, 5d* and *5e* show the development of the flux linkage curve;

FIGS. *6a, 6b* and *6c* are a series of developed views to illustrate that only a controlled amount of the primary magnetic polar field is permitted to link any one of the coil windings as the rotor moves relative thereto, hence describing a flux linkage curve having a constant slope with the slope changing direction abruptly;

FIG. 7 is a front elevational view schematically illustrating an alternate embodiment of the invention;

FIG. 8 is a perspective view schematically illustrating the embodiment of the invention shown in FIG. 7; and, FIG. 9 (Sheet 1) is a fragmentary view of the stator with every tooth containing a coil winding to provide two output phases.

Figure 1:
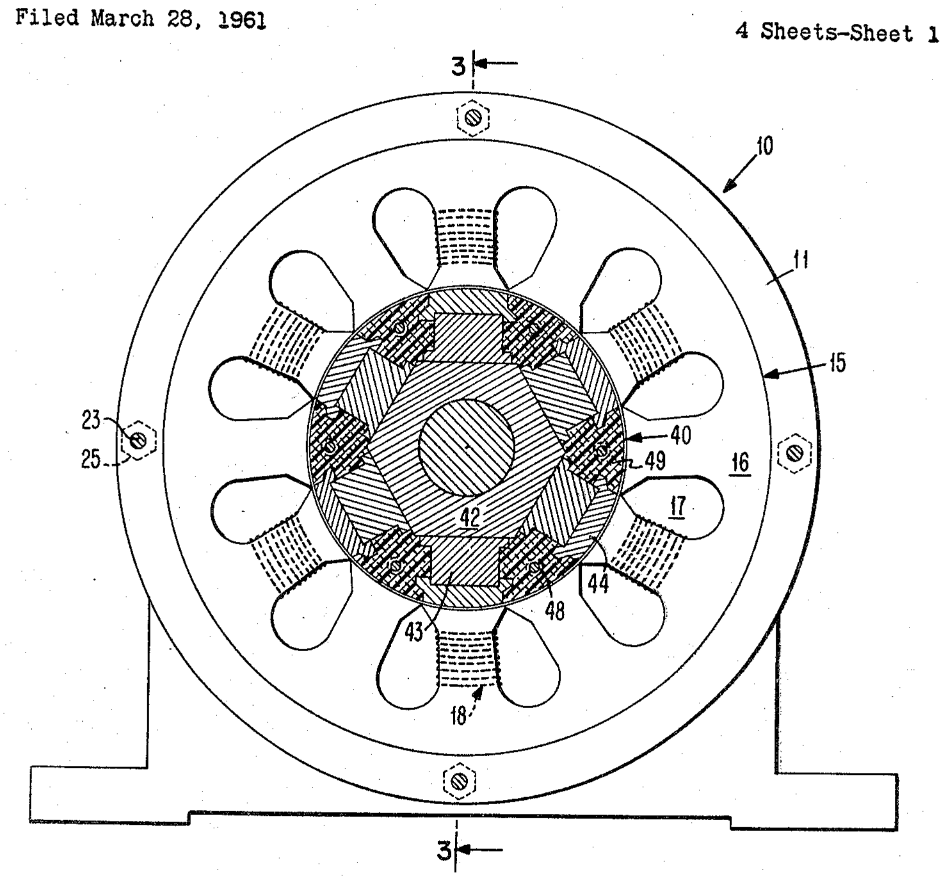
FIG. 1 is a front elevational view in section showing the rotor and stator of the alternating current generator.

Referring to the drawings and particularly to FIG. 1, the invention is illustrated by way of example as an alternating current generator 10 capable of generating an alternating current voltage having a square or rectangular waveform. The alternating current generator 10 comprises a stator and rotor housing and support 11, a laminated stator ring 15 and a fabricated rotor 40.

Figure 3:
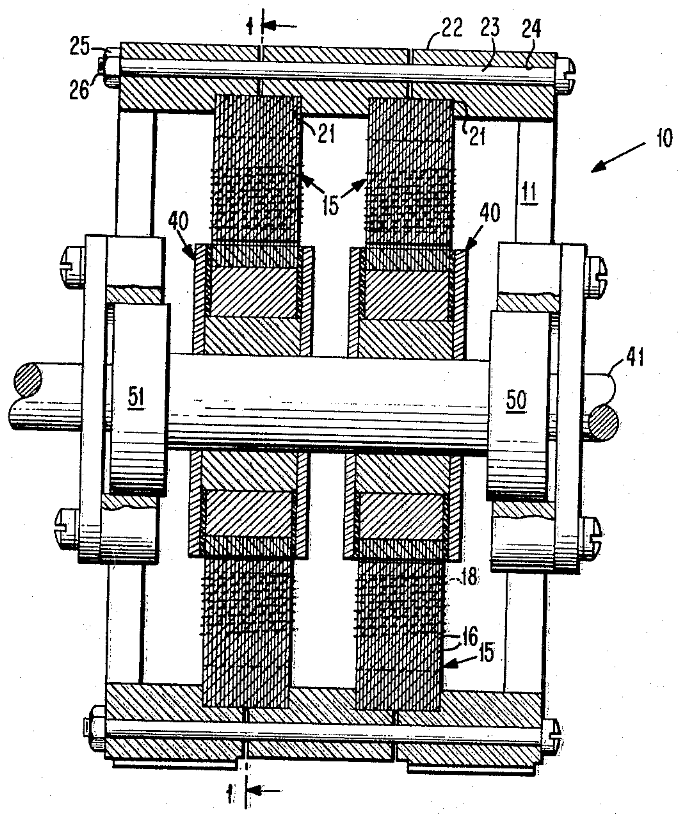
FIG. 3 is a sectional view of an alternating current generator having a series of axially spaced associated rotors and stators to provide a generator capable of generating a series of alternating current voltages having square or rectangular waveforms of different phase relationships.

The stator ring 15, FIGS. 1 and 3, is formed from a plurality of laminations 16 of electrical iron, each lamination 16 being provided with a series of arcuately spaced closed winding slots 17, FIG. 1, which are punched into the laminations 16. The closed winding slots 17 have a teardrop configuration and are positioned so as to present a small sectional thickness near the inner peripheral surface of the stator ring 15. Hence, the stator ring 15 is constructed in a manner to furnish substantially a uniform reluctance to the magnetic fields through all magnetic paths. This arrangement provides magnetic paths of substantially equivalent reluctance for linking and nonlinking fluxes. Hence, the linking flux is directly related in time to the motion of the field. Further, by maintaining the width of the section of the stator ring 15 at the bottom of the winding slot adjacent the rotor surface at a small sectional thickness, the material at this point then saturates at a small level of magnetic induction and prevents any noticeable magnetic shorting of the primary field. Since the inner peripheral surface of the stator ring 15 is continuous, a separated tooth or salient tooth stator does not exist. Accordingly, the stator will be considered to have virtual teeth. During any one output phase, certain virtual teeth will provide the magnetic circuit for the linking flux while other virtual teeth provide the magnetic circuit for nonlinking flux. Of course, because the inner peripheral surface of the stator ring is continuous, flux straying in the stator does not occur. For a single phase output, the closed winding slots 17 are threaded by coils of wire 18 as shown in FIG. 1. The number of turns of wire in a coil 18 of course depends upon the wire size and the desired output from the generator 10. A double phase output with the outputs 90° out of phase may be had by winding coils of wire 18 upon each virtual tooth as in FIG. 9. It is to be understood that, with the coil windings 18 on each virtual tooth, one tooth will provide a magnetic path for the linking flux while adjacent teeth provide magnetic paths for nonlinking flux.

In this example, the stator ring 15 is actually constructed by applying a dry film adhesive to the laminations 16 and then curing the composite structure under pressure for a predetermined time at an elevated temperature. The amount of pressure applied is equal to that required to maintain specified stator ring thickness in a fixture. Excellent results were achieved by curing the adhesive for approximately ten minutes at a temperature of 320° F.

Figure 2:
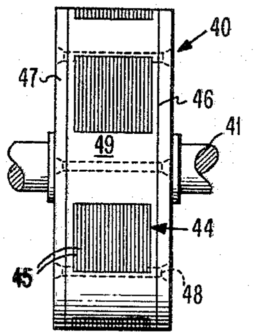
FIG. 2 is a side elevational view of the rotor.

The rotor 40 is fabricated according to techniques already well known in the art. In this example, the rotor 40 is mounted upon a central shaft 41, FIGS. 1, 2 and 3. The rotor 40, FIG. 1, is a composite member consisting of a central hexagonally shaped core 42 of electrical iron which embraces the shaft 41. There is a T-shaped permanent magnet 43 mounted on each face of the central hexagonal core 42 in a manner that the leg of the T faces outwardly. To assure a substantially uniform magnetic field across the pole face, soft iron shoes 44 are attached to the outer surfaces of the permanent magnets. The soft iron shoes 44 are formed from laminations 45, as seen in FIG. 2. The rotor assembly 40 is flanked on each side by a pair of stainless steel plates 46 and 47 which are held in spatial relationship by means of rivets 48. All of the components in the assembly are then bonded together with a cold flow aluminum filled epoxy resin represented by reference character 49. The permanent magnets 43 are polarized so that alternate poles have the same polarity and adjacent poles are of opposite polarity. In this example, all poles are magnetically balanced with a maximum variation from pole to pole of approximately 2 percent.

It is seen that the rotor 40 has the same number of poles as the stator ring 15 has winding coils 18 for any one output phase and that the angular spacing of the two is substantially the same. The width of the pole shoes 44 is substantially equal to the width of the virtual teeth of the stator ring 15. Accordingly, the basic conditions imposed by the flux linkage curve are satisfied; that is, the ratio of the number of rotor poles on the rotor 40 to the number of virtual stator teeth of the stator ring 15 in each output phase is one to one and the width of the rotor poles and virtual stator teeth is substantially equal and equal to one-half the pitch and the coils are individually wound on the virtual stator teeth. Furthermore, the amount of flux linking any one winding coil 18 is controlled by providing a magnetic path of equivalent reluctance for the nonlinking flux.

The stator 15 is mounted within the housing 11 as shown in FIG. 3. Essentially, the housing 11 is cylindrical in shape and the inner periphery thereof is recessed at 21 to receive the stator rings 15. The rim 22 of the housing 11 is slotted so that a pinching or gripping force may be exerted upon the stator rings 15 through the facility of bolts 23 extending through bores 24 and secured by means of nuts 25 screwed onto threaded portions 26 of the bolts 23, as shown in FIGS. 1 and 2. The shaft 41 bearing the pair of axial spaced rotors 15 is journalled within the housing 11 by conventional bearing assemblies 50 and 51. The rotor 40 is adapted to be rotated at approximately 12,000 r.p.m.

Figure 4:
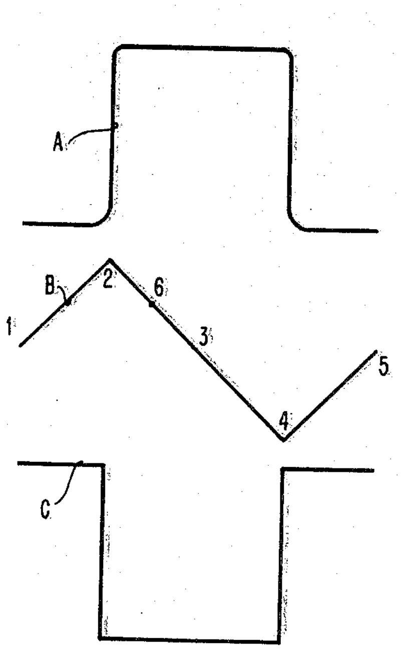
FIG. 4 is a diagram showing a series of curves A, B and C, curve A being illustrative of the magnetic field as it actually exists, curve B being illustrative of the flux linkages developed as the rotor rotates relative to a single winding of the stator, and curve C being illustrative of the voltage developed in the single winding.
Figures 5A, 5B, 5C, 5D, 5E:
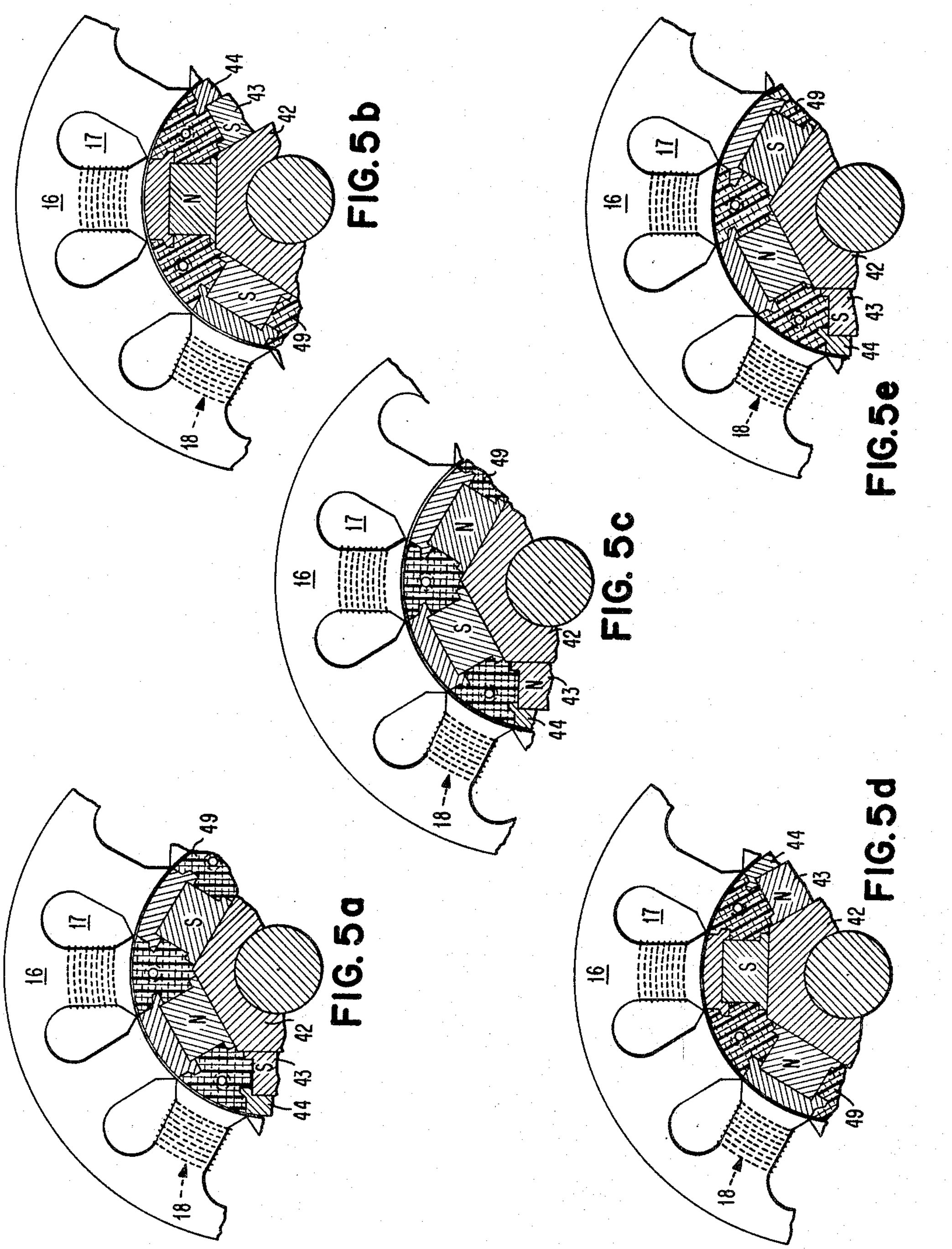
Figures 6A, 6B, 6C:
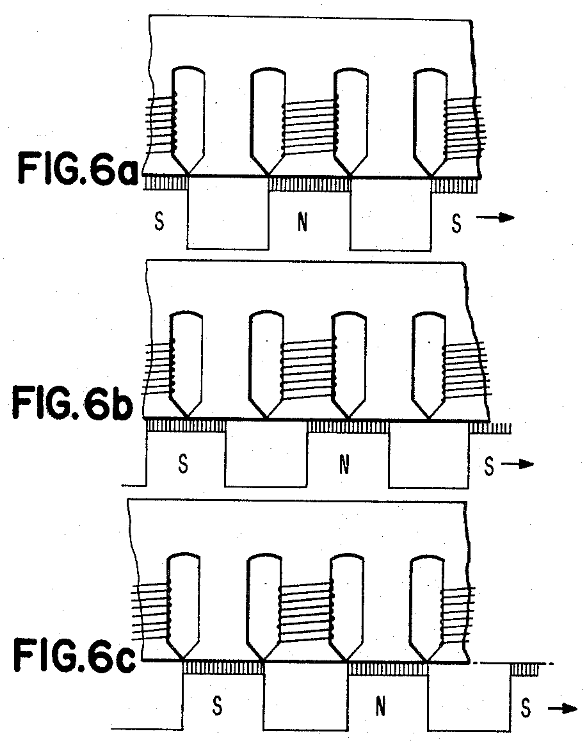

Curve A of FIG. 4 represents the magnetic field as it actually exists relative to the stator. Briefly, the field form was obtained by a magnetic field measuring instrument, not shown, employing a Hall probe evaporated on the inside of a ring which simulates the pulse generator stator ring. The rotor journalled concentrically with the measuring instrument is rotated relative to the probe. Hence, the permanent magnet rotor field is determined in a magnetic circuit similar to that of the generator. The field form has also been obtained by mathematical analysis employing conformal mapping techniques.

Curve B of FIG. 4 illustrates the flux linkages developed as the rotor rotates relative to a single winding of the stator. The flux linkage curve is plotted against the displacement of the rotor poles as they move past a virtual stator tooth, as shown in FIGS. *5a*, *5b*, *5c*, *5d* and *5e*. In FIG. *5a*, the north pole is out of the area directly under the virtual stator tooth. Under these conditions, the flux linkage curve B, FIG. 4, is at point 1, the flux linkages being zero. As the rotor rotates, the north pole becomes directly aligned with the virtual stator tooth, as shown in FIG. *5b*, and the flux linkage curve B, FIG. 4, is at point 2, the flux linkages being at a maximum for the particular polarity. Upon further rotation of the rotor, the north pole moves out from directly under the virtual stator tooth, as in FIG. *5c*, and the flux linkage curve B is at point 3, again the flux linkages being zero. As the rotor continues to rotate, a south pole becomes directly aligned with the virtual stator tooth, as in FIG. *5d*, and the flux linkage curve B, FIG. 4, is at point 4, with the flux linkages being at a maximum for the particular polarity. Further rotation of the rotor moves the south pole out from under the virtual stator tooth, as in FIG. *5e*, and the flux linkage curve B is at point 5, the flux linkages being zero.

The voltage generated in the coils 18 threading the winding slots 17 is due to the time rate of change of flux linkages, which is the derivative of the flux linkage curve, FIG. 4, curve B. The voltage curve C, FIG. 4, is positive for that portion of the flux linkage curve which is increasing and is negative for that portion where the flux linkage curve has a decreasing slope.

FIGS. *6a*, *6b* and *6c* illustrate the flux which links and which does not link any one coil winding as the rotor is moved relative thereto. It is seen that in FIG. *6a* all the flux from the rotor pole is linking the coil winding. The flux linkage curve under this condition is at a maximum for the particular polarity, as at point 2, FIG. 4, curve B. As the rotor pole moves to the position shown in FIG. *6b*, approximately one-half of the flux of the total flux from the rotor pole links the coil winding, while the other half of the flux is returned by a magnetic path having a reluctance equivalent to the magnetic path for the linking flux, as at point 6, FIG. 4, curve B. In FIG. *6c*, the rotor pole has been moved to a position where none of the flux links the coil winding, as at point 3, FIG. 4, curve B.

In generator constructions known heretofore, some of the flux which was not to link the coil winding did link it because the magnetic path for the linking flux was of less reluctance than the one for the nonlinking flux. Consequently, more flux would link the coil windings to result in a flux linkage curve having a nonconstant slope and not changing direction abruptly.

FIGS. 7 and 8 show an alternate embodiment for the invention. This embodiment, at the present time, is less preferred because it is more difficult to construct. However, with the advent of new materials, it and other equivalent embodiments may become more practical.

The alternate embodiment essentially consists of a stator 60 and rotor 80, each being in the general shape of a disk. The stator 60 is preferably fabricated from a series of concentric laminations of electrical iron to form a disk having a central opening or core 61. Winding slots 62 extend from the outer periphery to the inner periphery of the disk and have their axes located along radial lines. One end of the winding slots terminate along one face 63 of the disk to present a small sectional thickness near the face 63 and to provide virtual stator teeth 64. The face 63 furnishes substantially a uniform reluctance to the magnetic fields in all paths. The closed winding slots are threaded by coils of wire 65, as in FIGS. 7 and 8. Of course, every virtual tooth may be wound to provide two outputs displaced 90° from each other.

The rotor 80, made of magnetic material, is attached to a shaft 81 of nonmagnetic material. The shaft 81 is adapted to be driven by any suitable means. Poles 82 of the rotor 80, best seen in FIG. 8, are magnetized so that alternate poles have the same polarity and adjacent poles are of unlike polarity. The rotor poles 82 are angularly spaced as are pairs of winding slots 62, and the width of the poles 82 is substantially equal to the width of the virtual teeth 64 of the stator. The housing for the stator 60 and rotor 80 is not shown; however, any suitable mounting arrangement can be provided so that the stator 60 and rotor 80 are facing each other, as in FIG. 7, with a minimum air gap therebetween. The magnetic field is set up as seen in FIG. 7.

The sides 83 and 84 of the rotor poles 82 are along radial lines so that, as the rotor 80 is displaced, the magnetic field is moved uniformly relative to the stator 60. This arrangement also results in providing magnetic paths of equivalent reluctance for the linking and nonlinking magnetic fields. Hench, the flux linkage curve developed is the same as in FIG. 4, curve B.

While the invention has been particularly shown and described with reference to preferred embodiments thereof, it will be understood by those skilled in the art that various changes in form and details may be made therein without departing from the spirit and scope of the invention.

What is claimed is:

1. A square wave generator comprising: a stator having a predetermined number of arcuately spaced closed winding slots, each slot terminating at one end in close proximity to the inner periphery of said stator to provide a number of virtual stator teeth equal in number to said predetermined number of winding slots, said virtual stator teeth being separated by a sectional thickness which becomes magnetically saturated without shorting the magnetic fields of said virtual stator teeth; a rotatable rotor having polarized magnetic poles equal to half the number of virtual stator teeth, said poles having substantially the same width as said virtual stator teeth, the width of said poles and virtual stator teeth being substantially equal to one-half the pitch; and a number of coils equal to half the number of said virtual stator teeth, each coil threading a pair of winding slots so as to embrace a portion of the stator between said pair of winding slots whereby the magnetic circuit for the flux linking said coils has substantially the same reluctance of the magnetic circuit for the non-linking flux so that a voltage wave form with discontinuities is generated in each coil due to the time rate of change of flux linkages as said rotor and stator relatively rotate uniformly.

2. In the combination of a stator and a concentrically mounted rotatable rotor having permanent magnet excitation for a square wave generator, the improvement comprising: a continuous inner surface for said stator to provide a uniform reluctance to magnetic fields, said stator having a plurality of arcuately spaced closed winding slots with the winding slots terminating at said continuous inner surface to provide a sectional thickness which becomes magnetically saturated to prevent shorting of the magnetic fields and still provide magnetic circuits for linking and non-linking flux with substantially the same reluctance; a plurality of coils, each coil threading said winding slots in pairs; and a plurality of polarized arcuately spaced radially extending poles for said rotor whereby, upon rotation of said rotor, a voltage wave form having discontinuities due to the time rate of change of magnetic flux linkages is generated within each coil winding.

3. A square wave generator comprising: a stator ring having a continuous inner peripheral surface to provide a uniform constant reluctance, said stator ring having a plurality of arcuately spaced closed winding slots through which coils of wire are threaded, said slots terminating at said continuous inner peripheral surface to provide a sectional thickness which becomes magnetically saturated to prevent shorting of the magnetic fields and still provide magnetic circuits for linking and non-linking flux with substantially the same reluctance; a plurality of coils, each coil threading said winding slots in pairs; and a rotor having a permanent magnet excitation system for a plurality of radially extending poles, said rotor being mounted to rotate concentrically within said stator ring so as to generate a voltage within each coil which is due to the time rate of change of magnetic flux linkages.

4. A square wave generator comprising: a central shaft journalled for rotation; a rotor mounted upon said central shaft, said rotor comprising a hexagonally shaped cylinder of electrical iron provided with a central bore for embracing said central shaft, a rectangular shaped permanent magnet fixed to extend radially from each face of said hexagonally shaped cylinder, a laminated pole shoe fixed to each permanent magnet, said pole shoe having an arcuate shaped pole face of a number of degrees of arc equal to one-half the pitch of the pole shoes, and aluminum filled epoxy resin disposed between adjacent magnets and pole shoes to bond the same in spatial relationship; a stator ring fixed concentric with said rotor, said stator ring having a continuous inner surface to provide uniform reluctance to magnetic fields and arcuately spaced closed winding slots corresponding in number to twice the number of pole shoes, said winding slots being spaced from each other a distance equal to one-half the pitch of said pole shoes; and a number of coils equal to the number of pole shoes threading said winding slots in pairs whereby a voltage is generated in each coil due to the time rate of change of magnetic flux linkages as said rotor rotates relative to said stator.

5. A square wave generator as in claim 4 wherein said closed winding slots have a configuration and are positioned so as to present a small sectional thickness near the inner peripheral surface of said stator ring.

6. An alternating current generator comprising: a rotor having a plurality of arcuately spaced poles, adjacent poles being of opposite polarity; a stator having winding slots formed therein to provide magnetic paths of equivalent reluctance for nonlinking and linking magnetic flux; and coils threading said winding slots so that the voltage generated therein is due to the time rate of change or magnetic flux linkages.

7. An alternating current generator comprising: a coil winding, means for providing a moving magnetic field relative to said coil winding, and means for controlling the amount of magnetic field linking said coil winding by providing magnetic paths of substantially equivalent reluctance for the linking and nonlinking portions of the magnetic field.

8. An alternating current generator comprising: at least a pair of magnetic poles having opposite polarity and relatively rotatable to produce a moving magnetic field, at least one coil winding disposed in a position to be linked by said moving magnetic field as said pair of magnetic poles are relatively rotated, and means for providing magnetic paths for said moving magnetic field so that said moving magnetic field links said coil winding in a manner to describe a curve having a constant slope with the slope changing abruptly from direction to an opposite direction.

9. A square wave generator comprising: a stator having a pre-determined number of arcuately spaced closed winding slots, each slot terminating at one end in close proximity to the inner periphary of said stator to provide a number of virtual stator teeth equal in number to said pre-determined number of winding slots; a rotatable rotor having polarized magnetic poles equal to half the number of virtual stator teeth, said poles having substantially the same width as said virtual stator teeth, the width of said poles and virtual stator teeth being substantially equal to one-half the pitch; and a number of coils equal to the number of virtual stator teeth, each coil threading a pair of winding slots so as to embrace a portion of the stator between said pair of winding slots whereby the voltage is generated in each coil, due to the time rate of change of flux linkages as said rotor and said stator relatively rotate, the voltage outputs of adjacent coils being 90° phase displaced from each other.

References Cited in the file of this patent

UNITED STATES PATENTS

| | | |
|---|---|---|
| 522,580 | Bell | July 10, 1894 |
| 1,396,521 | Myers | Nov. 8, 1921 |
| 1,504,145 | Rothenberger | Aug. 5, 1924 |
| 1,898,728 | Huff | Feb. 21, 1933 |
| 2,432,117 | Morton | Dec. 9, 1947 |
| 2,871,384 | Gabriel | Jan. 27, 1959 |